Nov. 4, 1947.　　　　E. LIDOW ET AL　　　2,430,351
RECTIFIER
Filed July 10, 1945
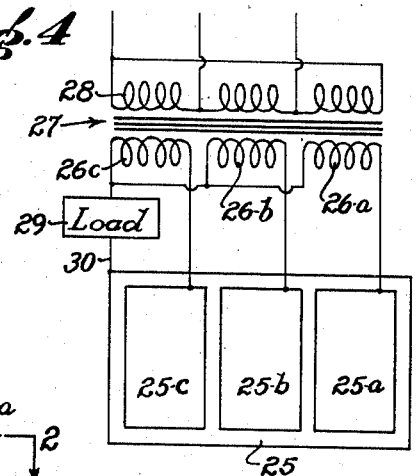
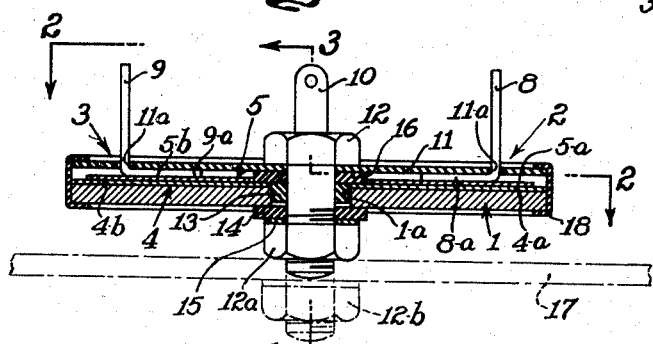
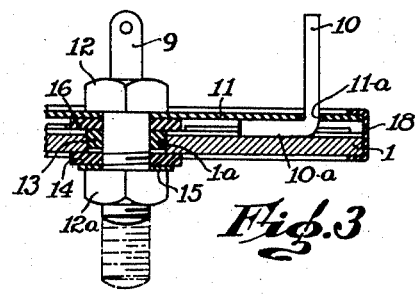
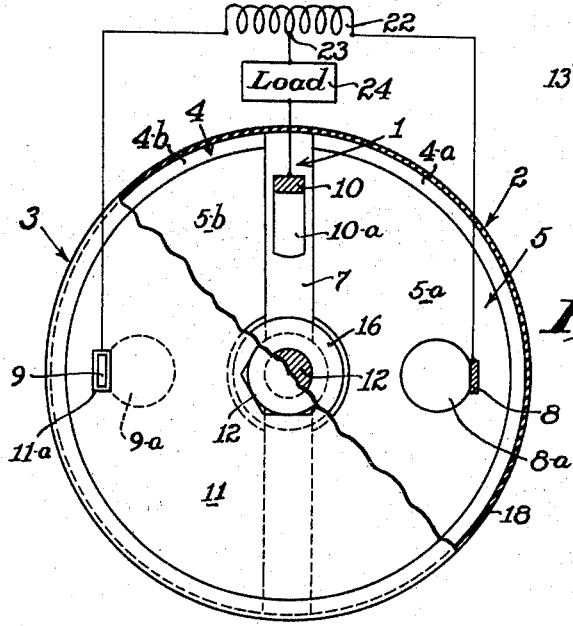
Eric Lidow
Carl E. Holmes
INVENTORS
BY
Attorney Patented Nov. 4, 1947

2,430,351

UNITED STATES PATENT OFFICE 2,430,351

RECTIFIER

Eric Lidow, Los Angeles, and Carl E. Holmes, La Crescenta, Calif., assignors to Tellurium Corporation of America, Los Angeles, Calif., a corporation of California Application July 10, 1945, Serial No. 604,168

6 Claims. (Cl. 175—366)

This invention relates to dry plate rectifiers, and particularly to a rectifier having a plurality of sections and adapted for use in full wave rectification.

It is an object of this invention to provide a multiple section rectifier of novel form; which is of small size for a given capacity; which is economical to fabricate and assemble, and which can be readily made moistureproof.

It is another object of this invention to provide such a rectifier which can be easily mounted, and which possesses good cooling qualities when mounted on a panel.

It is another object of this invention to provide a multiple section rectifier wherein the individual sections have uniform electrical characteristics.

It is still another object of this invention to provide a multiple section rectifier employing a common base or back electrode, and which is suitable for panel mounting.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the drawings:

Figure 1 is a cross section of a rectifier embodying the invention, the relative thicknesses of the parts being exaggerated for clarity;

Figure 2 is a plan view, partly in section, taken as indicated by the line 2—2 of Figure 1, a rectifier circuit being shown diagrammatically in connection therewith;

Figure 3 is a fragmentary cross section taken as indicated by the line 3—3 of Figure 1; and Figure 4 is a diagram showing a modified form of rectifier connected in a polyphase circuit.

Referring to Figures 1, 2 and 3 of the drawing, a rectifier is shown as having two sections and comprising a single base member 1 which forms the back electrode for the sections 2 and 3 of the rectifier. These sections comprise layers 4—a and 4—b respectively, capable of conducting electricity in one direction only, and overlaid by conducting layers 5—a and 5—b, which may be of "Woods" metal, forming the front electrodes. These layers 4—a, 4—b and 5—a, 5—b may be deposited each in their entirety to form layers 4 and 5 respectively, which are then severed to provide the separate sections; or the sections 4—a, 4—b may be deposited simultaneously, appropriate means being provided to maintain the sections electrically distinct, after which the sections 5—a and 5—b may be deposited likewise simultaneously, being maintained separate from each other as they are deposited. Although the rectifier is shown as having but a pair of equal sections, the layers 4 and 5 could as well be divided to provide unequal areas should such be desired for special purposes, or the layers could be divided into three or more sections.

In the present instance it is proposed to provide a pair of similar sections for use with a center tapped transformer to provide full wave rectification. A rectifier constructed in the manner disclosed has important advantages for such use, the electrical characteristics of the two sections being readily made identical, since a common back electrode is employed and the rectifying layer 4 and the front electrode 5 of both sections are each formed simultaneously.

The base member 1 comprises a stiff metallic plate, of suitable material, such as iron for example, and of any preferred configuration, as circular. The uni-conducting layer 4 is formed directly on the surface of the member 1 and overlays the entire surface. The layer 5 forming the front electrode overlays the layer 4, but preferably does not extend to the edge thereof. The layers 4 and 5 are divided respectively into the sections 4—a and 4—b, and 5—a and 5—b by a space 7 extending diametrically across the base 1. The separation provided by the space 7 can be quite small, but as will be now explained, the space is made wider than is necessary for this purpose.

Terminals 8 and 9 are provided for the front electrodes 5—a and 5—b of the sections 2 and 3, respectively, and a terminal 10 is provided for the back electrode 1. Each terminal has a bent portion or foot 8—a, 9—a or 10—a, as the case may be, for engaging the corresponding electrode. The space 7 is made sufficiently wide to provide suitable clearance for the foot 10—a, to avoid electrical contact between the layers 4—a, 4—b and 5—a, 5—b, and the terminal 10. A cover plate 11 of insulating material overlays the front electrodes 5—a and 5—b, having suitably spaced openings 11—a for accommodating the terminals 8, 9 and 10, and by engagement with the terminal portions 8—a, 9—a and 10—a, maintains the terminals 8, 9 and 10 properly positioned and in good electrical contact with the corresponding electrodes.

For this purpose, a bolt 12 is provided which clamps the cover plate 11 to the base member 1 by means of a nut 12—a. An important feature of the construction is that this bolt 12 is insulated from the rectifier. Thus, an insulating sleeve 13 is provided in the hole 1—a which accommodates the bolt 12 in the member 1, and an insulating washer 14 is provided between the outside of the member 1 and the nut 12—a. A lock washer 15 may be provided for this nut if desired. The arrangement is such that tightening of the bolt 12 urges the plate 11 toward the member 1, so that the plate 11 effectively clamps the terminals 8, 9 and 10 against their respective electrodes. A spacer 16, also of insulating material, may be provided between the cover plate 11 and the member 1 to prevent excessive flexure of this plate upon tightening of the bolt 12.

Since the bolt 12 is completely insulated from the rectifier elements, it may be used to provide a single hole mounting for the rectifier in a metal panel 17, indicated by the broken lines in Figure 1. For this purpose, a bolt 12 of increased length is provided to accommodate a second nut 12—b. In this way, the rectifier can be mounted and dismounted as a unit without disturbing the rectifier assembly or breaking the layer of moisture proof sealing material usually provided for protecting the rectifier. Furthermore, the rectifier is in this way spaced from the panel which allows better air circulation and cooling.

Where there is no objection to the panel such as 17 having a polarity, the insulating washer 14 may be omitted and the back electrode 1 clamped directly against the panel by the nut 12—a. In this case, the panel will of course have the same polarity as the back electrode.

A rectifier arranged in the manner disclosed is readily made moisture proof by spraying or dipping to provide a covering layer of suitable material (not shown). To prevent entry of such material between the plate 11 and the base member 1, and possible damage thereby to the rectifying layer, the plate 11 and the member 1 are made coextensive and their peripheries sealed as by a strip of moisture proof tape 18.

Figure 2 shows the rectifier connected for full wave rectification. Therein, a transformer 20 is provided, having a primary 21 connected to a suitable source of alternating current and a secondary 22 having a center tap 23. The ends of the secondary 22 are connected to the rectifier sections 2 and 3 by terminals 8 and 9. The center tap 23 is connected to the back electrode 1 through the load 24. The operation of such a circuit is well known. The positive current appearing alternately at the opposite ends of the primary 22 will be transmitted by the rectifier sections 2 and 3 to the back electrode 1, and thence through the load 24 back to the center tap 23, appearing as a pulsating uni-directional current across the load 24.

A modified form of the invention is shown in Figure 4. Therein a rectifier is shown having a rectangular base plate 25 with three substantially identical rectifying sections 25—a, 25—b and 25—c on one side thereof, the base plate 25 forming the common back electrode for these sections. Such a rectifier is particularly useful in rectifying three phase, due to the uniform characteristics of the sections as previously pointed out.

The rectifying sections 25—a, 25—b and 25—c are connected respectively to the secondary windings 26—a, 26—b, and 26—c of a conventional transformer 27, the primaries 28 of which are arranged to be supplied with three phase alternating current. The load 29 is interposed in the common return 30 from the back electrode 25 to the secondary windings 26—a, 26—b and 26—c. The operation of such a circuit is well known.

We claim:

1. In a rectifier, a base member forming the back electrode, a rectifying layer and a front electrode on the base, a terminal for each of said electrodes having a portion adapted to contact the associated electrode, a plate of insulating material overlaying the front electrode and secured to the base member for positioning and maintaining the terminals in assembled relation with the electrodes, said plate being substantially coextensive with the base member, and means sealing between the cover plate and base member about the peripheries thereof.

2. A rectifier comprising a base plate, a rectifying layer partly covering the base plate and a front electrode over the rectifying layer, a terminal member against the uncovered part of the base plate, a second terminal member in contact with the front electrode, a lead connected to each terminal member, a plate of insulating material overlying the front electrode, and means for holding the plate against the terminal members to retain the terminal members in position, said plate having openings through it for the leads from the terminal members to pass through.

3. A rectifier comprising a base plate, a plurality of rectifying layers side by side over the base plate with a strip of the base plate between the layers, a front electrode over each rectifying layer, a terminal member against each front electrode and against the base plate, a lead connected to each terminal member, a plate of insulating material overlying the front electrodes and means for holding the plate against the terminal members to retain them in position, said plate having openings through it for the leads from the terminal members to pass through.

4. A rectifier comprising a base plate, a pair of rectifying layers side by side partly covering the base plate and separated from each other, and a front electrode over each rectifying layer, a terminal member against each front electrode, a plate of insulating material overlying the front electrodes, a hole through the base plate and the insulating plate, a clamping means passing through the hole and clamping the base plate and insulating plate toward each other so that the insulating plate holds the terminal members against their respective front electrodes, said insulating plate having holes through it for the passage of the leads from the terminal members.

5. A rectifier according to claim 4 in which insulating means is located in the hole to insulate the clamping bolt from the base plate and front electrode.

6. A rectifier comprising a base plate, a plurality of rectifying layers side by side over the base plate with a strip of the base plate between the layers, a front electrode over each rectifying layer, a terminal member against each front electrode, a lead connected to each terminal member, a plate of insulating material overlying the front electrode, a hole through the insulating plate and the base plate, a bolt means through the holes and clamping the insulating means toward the base plate to retain the terminal members in position against their respective front electrodes, said plate having openings through it for the leads from the terminal members to pass through and sealing means around the periphery of the insulating plate and the base plate to seal the two plates together.

ERIC LIDOW.
CARL E. HOLMES.

REFERENCES CITED

The following references are of record in the file of this patent:

UNITED STATES PATENTS

| Number | Name | Date |
|---|---|---|
| 1,743,160 | Presser | Jan. 14, 1930 |
| 2,089,830 | Grondahl | Aug. 10, 1937 |
| 2,215,667 | Sherman | Sept. 24, 1940 |
| 2,243,573 | Murphy | May 27, 1941 |
| 2,327,511 | De Lange | Aug. 24, 1943 |
| 2,380,080 | Shoemaker | July 10, 1945 |